United States Patent [19]

Takimoto et al.

[11] Patent Number: 4,576,324

[45] Date of Patent: Mar. 18, 1986

[54] GAS PRESSURE WELDING MACHINE

[75] Inventors: Tadashi Takimoto, Fuchu; Hirotsugu Oishibashi, Musashino; Katsuyoshi Ueyama, Musashino; Muneyuki Ohara, Musashino; Akio Kobayashi, Hachiohji; Keiichi Aoki, Tokyo; Mitsuo Nakamura, Higashi-Kurume; Kenzo Hagiwara, Hachiohji, all of Japan

[73] Assignees: Japanese National Railways; Hakusan Seisakusho Co., Ltd., both of Tokyo, Japan

[21] Appl. No.: 694,167

[22] Filed: Jan. 23, 1985

[30] Foreign Application Priority Data

Feb. 22, 1984 [JP] Japan .................... 59-33273

[51] Int. Cl.⁴ ............................. B23K 37/00
[52] U.S. Cl. ..................... 228/44.3; 228/13; 228/19
[58] Field of Search ............ 228/44.3, 125, 19, 13; 219/78.15

[56] References Cited

U.S. PATENT DOCUMENTS

| | | | |
|---|---|---|---|
| 3,438,561 | 4/1969 | Calton | 228/13 |
| 3,595,463 | 7/1971 | Fadeev | 228/44.3 |
| 3,662,941 | 5/1972 | Gage | 228/19 |
| 3,790,058 | 2/1974 | Filkorn | 228/13 |
| 3,853,258 | 12/1974 | Louw | 228/13 |
| 4,014,494 | 3/1977 | Glagolev | 228/13 |
| 4,043,497 | 8/1977 | Jones | 228/19 |
| 4,272,003 | 6/1981 | Oishibashi | 228/13 |
| 4,410,780 | 10/1983 | Mutti | 219/78.15 |
| 4,440,338 | 4/1984 | Stevenson | 228/13 |

FOREIGN PATENT DOCUMENTS

| | | | |
|---|---|---|---|
| 42040 | 9/1972 | Japan | 228/19 |
| 36616 | 4/1976 | Japan | 228/19 |

Primary Examiner—Kenneth J. Ramsey
Assistant Examiner—Kurt Rowan
Attorney, Agent, or Firm—Wenderoth, Lind & Ponack

[57] ABSTRACT

A gas pressure welding machine comprises a movable clamp means for clamping one of reinforcing rods to be joined together, a stationary clamp means for clamping the other reinforcing rod, a punching die for punching-shearing a bulge being formed around a joint portion of the reinforcing rods, and a key connection mechanism for detachably connecting the movable clamp means and the punching die, whereby the reinforcing rods are subjected to pressure butt welding to form a bulge around a joint portion thereof and the bulge is immediately punching-sheared under red heat by the punching die.

4 Claims, 9 Drawing Figures

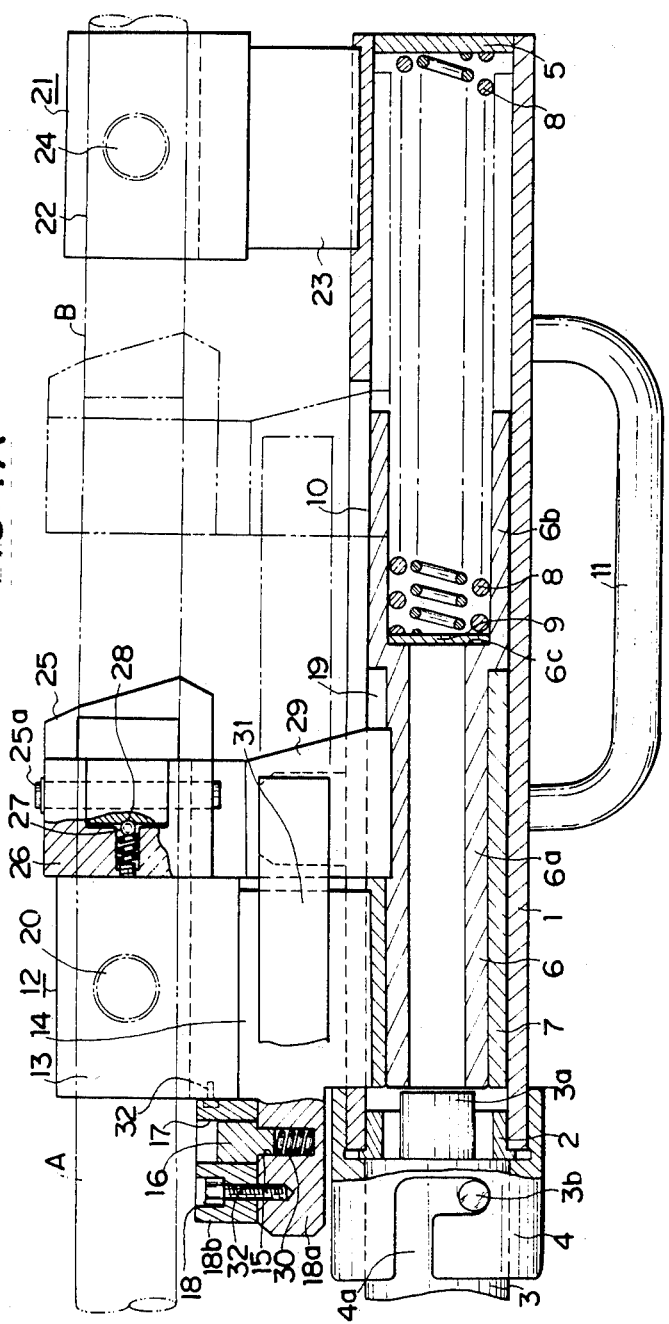

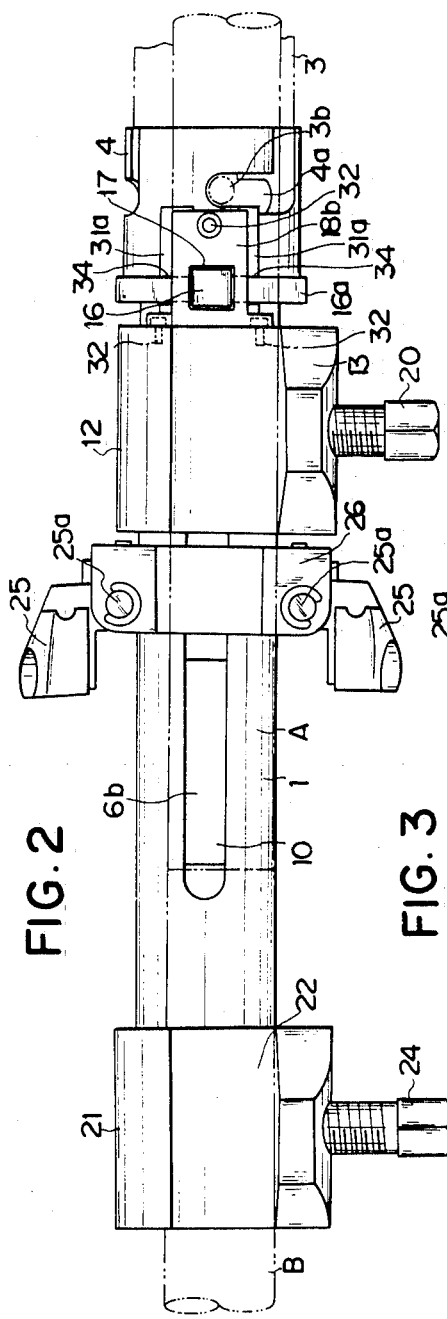
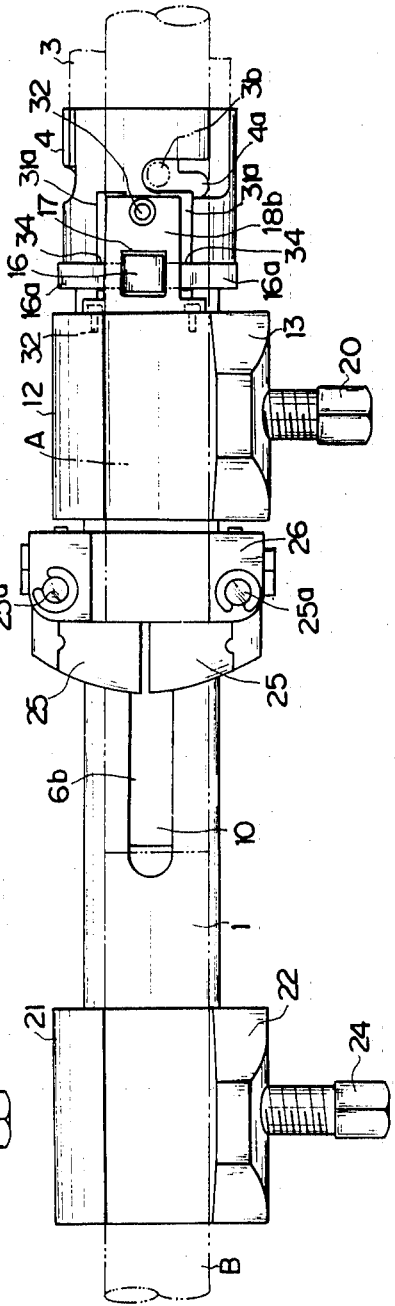
FIG. 2
FIG. 3

4,576,324

GAS PRESSURE WELDING MACHINE

BACKGROUND OF THE INVENTION

1. Field of the Invention:

The present invention relates to a gas pressure welding machine adapted to effect gas pressure welding of reinforcing rods etc. and punching-shear a bulge formed around a joint portion of the reinforcing rods etc. in consequence of the gas pressure welding.

2. Description of the Prior Art:

A gas pressure welding machine finds wide acceptance in use for field welding of reinforcing rods and is constructed so as to clamp the reinforcing rods to be joined together, exert pressure on the butted portions of the reinforcing rods under gas heating to effect gas pressure welding, and thereafter punching-shear a bulge formed about the joint portion. With a prior art gas pressure welding machine, however, since it is impossible to effect a punching-shearing operation immediately after termination of the pressure welding, the machine falls short of operation efficiency and punching effect.

OBJECT AND SUMMARY OF THE INVENTION

An object of the present invention is to provide a gas pressure welding machine adapted to move a movable clamp means and a punching die together when two members to be joined together are subjected to pressure welding and, after completion of the pressure welding, immediately move the punching die alone to subject a bulge formed around the joint portion of the two members to punching-shearing operation.

To accomplish the object described above according to the present invention, there is provided a gas pressure welding machine which comprises a movable clamp means for clamping one of reinforcing rods to be joined together, a stationary clamp means for clamping the other reinforcing rod, a punching die for punching-shearing a bulge formed around a joint portion of the reinforcing rods, and a key connection mechanism for detachably connecting the movable clamp means to the punching die.

The aforementioned and other objects, characteristic features and advantages of the present invention will become apparent from the further disclosure to be made hereinbelow in detail with reference to the accompanying drawings.

BRIEF DESCRIPTION OF THE DRAWINGS

FIG. 1A is a partially sectioned side view showing one embodiment of the gas pressure welding machine according to the present invention.

FIG. 2 is a plan view showing the gas pressure welding machine, with the punching die located at its punchingrelease position.

FIG. 3 is a plan view showing the gas pressure welding machine, with the punching die located at its punching position.

DETAILED DESCRIPTION OF THE PREFERRED EMBODIMENT

Figure 1B:
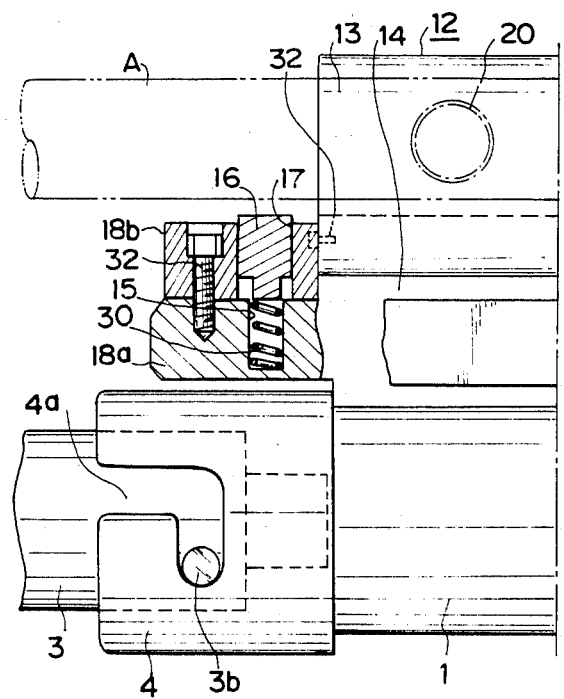
FIG. 1B is a partially sectioned side view showing coupling means for a movable clamp means of the gas pressure welding machine.

The present invention will now be described in detail with reference to the illustrated embodiment.

In the drawings, a bottomed guide cylinder 1 has its one end opened and its other end closed by a bottom wall 5. Into the inner circumference of the open end of the guide cylinder 1 there is fitted a bush 2, and a connection holder 4 is screw fitted around the outer circumference of the open end of the guide cylinder 1 for connecting thereto a pressure application cylinder 3.

Within the guide cylinder 1 there are slidably accommodated an inner cylinder 6 and an outer cylinder 7. The inner cylinder 6 comprises a small-diameter portion 6a and a large-diameter portion 6b which has its outer circumference brought into slide contact with the inner circumference of the guide cylinder 1. Between the bottom wall 5 and a laminar spring seat 9 which is fitted on an inside stepped portion 6c of the large-diameter portion 6b of the inner cylinder 6, there is interposed a return spring 8 which energizes the inner cylinder 6 toward the open end of the guide cylinder 1. The outer cylinder 7 is fitted around the small-diameter portion 6a of the inner cylinder 6. The aforementioned pressure application cylinder 3 is inextricably attached to the connection holder 4 by means of mutual cooperation of an L-shaped notch 4a formed in the connection holder and a pin 3a projected from the outer circumference of the pressure application cylinder, and has a ram 3a adapted to come into collision contact with the end face of the small-diameter portion 6a of the inner cylinder 6. The guide cylinder 1 is provided with a handle 11 and a guide slot 10 within which a support leg portion 14 of a movable clamp means 12 and a support leg portion 29 of a die holder 26 are allowed to slide.

The movable clamp means 12 comprises a clamping portion 13 in which one reinforcing rod A to be joined with the other reinforcing rod B is clamped by means of a clamping bolt 20, and the aforementioned support leg portion 14 which supports thereon the clamping portion 13. The support leg portion 14 of the movable clamp means 12 has its lower end passed through the guide slot 10 in the guide cylinder 1 and fixed firmly to the outer circumference of the outer cylinder 7 so that the support leg portion 14 may assume an upright posture. The outer cylinder 7 is provided with a guide slot 19 within which the aforementioned support leg portion 29 of the die holder 26 is allowed to slide.

A stationary clamp means 21 comprises a clamping portion 22 for clamping therein the reinforcing rod B with a clamping bolt 24 and a support leg portion 23 for supporting thereon the clamping portion 22. The support leg portion 23 of the stationary clamp means 21 has its lower end firmly fixed to the outer circumference of the guide cylinder 1 in an upright posture.

Denoted by reference numeral 25 is a punching die which is divided into a pair of edge members for punching-shearing a bulge being formed around a joint portion of the reinforcing rods A and B. The pair of edge members of the punching die 25 are pivotally supported on the die holder 26 with pivot pins 25a so as to be opened or closed together on hinges, like French doors, between their punching positions and their punching-release positions relative to the axes of the reinforcing rods A and B. The die holder 26 is provided with spring balls 27 which are received in plate-like receiving grooves 28 to locate the pair of edge members of the punching die 25 at their respective punching positions or punching-release positions when the pair of edge members are closed or opened relative to each other. The support leg portion 29 supporting thereon the die holder 26 has its lower end passed through the guide slot 10 in the guide cylinder 1 and the guide slot 19 in the outer cylinder 7 and fixed firmly to the outer circumference of the small-diameter portion 6a of the inner cylinder 6 so that the support leg portion 29 may rise outside the guide cylinder 1 in an upright posture.

The support leg portion 29 of the die holder 26 is provided on the opposite walls thereof with a pair of connection levers 31 which are extended backwardly along the opposite side walls of the support leg portion 14 of the movable clamp means 12 and which have their rear end portions serving as coupling means 13a for the die holder 26. On the other hand, the support leg portion 14 of the movable clamp means 12 is provided with a key retaining base 18a which is projected backwardly and a key retaining block 18b which is superposed on the key retaining base 18a and firmly fastened to both the key retaining base 18a and the support leg portion 14 with bolts 32 to thereby form a coupling means 18 for the movable clamp means 12. The key retaining base 18a and the key retaining block 18b, which constitute the coupling means 18, have communicating key operation holes 15 and 17 bored therein for vertically movably accommodating therein a coupling key 16. The coupling key 16 is elastically retained within the key operation hole 15 by means of a pushing-up spring 30 disposed on the bottom of the key operation hole 15 for urging the coupling key 16 toward the key operation hole 17 in the key retaining block 18b.

The key retaining block 18b is further provided in its side with a key hole 33 which communicates with the key operation holes 15 and 17. The coupling means 13a of the connection levers 31 are provided one each with key holes 34 which communicate with the key hole 33 in the key retaining block 18b when the movable clamp means 12 and the die holder 26 are coupled with each other.

In the present embodiment, the coupling means 18 for the movable clamp means 12 is formed of two separate parts, i.e. the key retaining base 18a and the key retaining block 18b. It may optionally be formed of one same part (not shown).

Figure 1C:
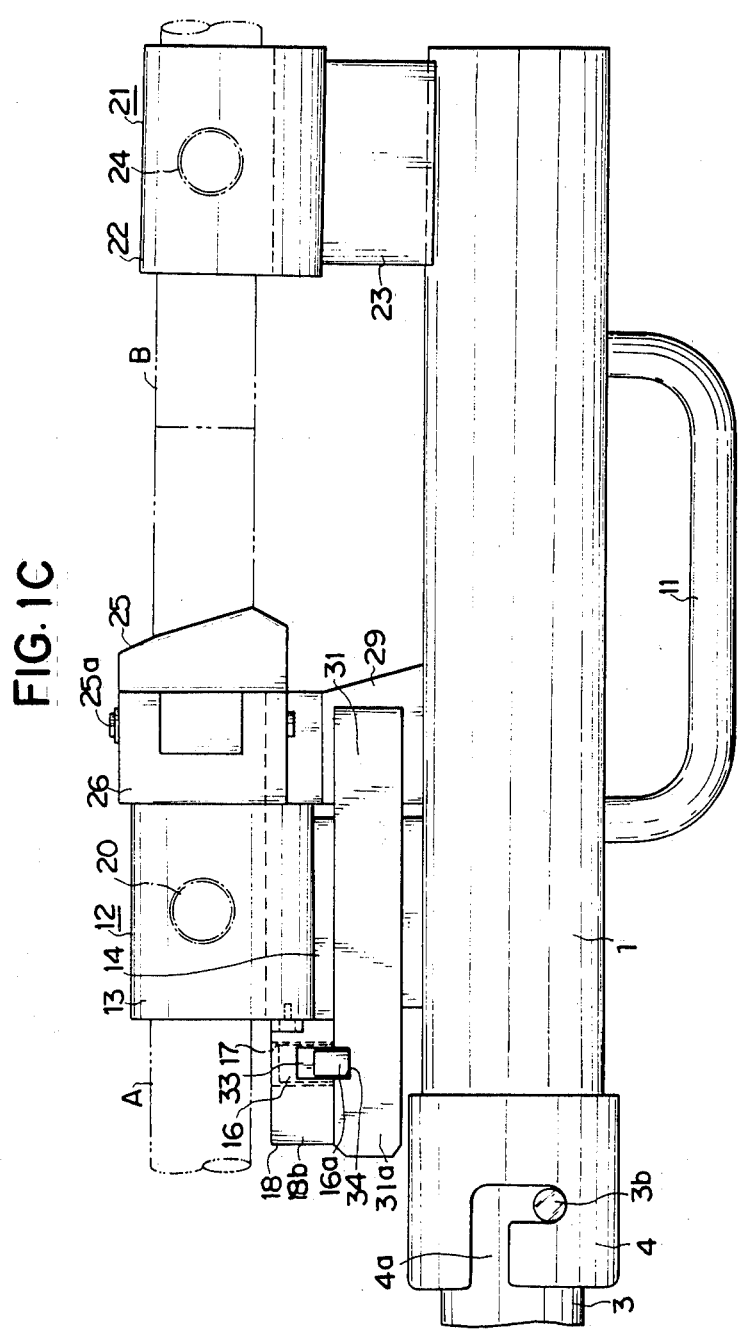
FIG. 1C is a side view showing the gas pressure welding machine, with a punching die connected to the movable clamp means.

The aforementioned coupling key 16 has a thumbpiece 16a which is passed through the key hole 33 with the opposite ends thereof projected from the side walls of the key retaining block 18b. The thumbpiece 16a is pinched by the finger tips and pushed down against the force of the pushing-up spring 30 (FIG. 1A) to be set at a position at which the thumbpiece 16a intersects the coupling means 18 and 31a. As a result, the coupling means 18 and the coupling means 31a (connection levers 31) are connected by means of the coupling key 16 (FIG. 1C) to couple the die holder 26 and the movable clamp means 12 with each other.

To be specific, in a state wherein the upper end of the coupling key 16 is disposed in the key operation hole 17 and the lower end of the thumbpiece 16a of the coupling key 16 is disposed in both the key operation hole 15 and the key holes 34 in the coupling means 31a, when the pressure application cylinder 3 is actuated to advance the ram 3a, pressure load is exerted on the upper and lower ends of the coupling key 16 in the opposite directions, thereby overcoming the force of the pushing-up spring 30 and maintaining the connection between the coupling means 18 and 31a. In that connection state, pressure welding of the reinforcing rods A and B is effected. Upon completion of the pressure welding, the application of pressure by the ram 3a of the pressure application cylinder 3 is stopped to release the pressure load exerted on the coupling key 16 and, as a result, the coupling key 16 is sprung by the pushing-up spring 30 (FIG. 1B) to disconnect the coupling means 18 and 31a from each other and enable only the die holder and the punching die thereon to be moved.

The connection between the coupling means 18 and 31a may optionally be effected by piercing a connection pin (not shown) through the coupling means 31a and 18. In this case, it is preferable that one end of the connection pin is connected to the handle 11 via a chain etc. (not shown) in order to avoid loss of the connection pin.

The operation of the embodiment of the gas pressure welding machine according to the present invention will now be described hereinafter.

The edge members of the punching die 25 are at first opened together on hinges to locate the punching die at its punching-release position. Then, the two reinforcing rods A and B are clamped in the respective clamping portions 13 and 22 of the movable and stationary clamp means 12 and 21 with the clamping bolts 20 and 24, and are butted against each other (FIG. 2). Subsequently, the edge members of the punching die 25 are closed together to locate the punching die at its punching position (FIG. 3). At this time, the punching die 25 is precisely located by the mutual cooperation of the spring balls 27 and the platelike receiving grooves 28 formed in the edge members.

Whereafter, the coupling key 16 is set to engage both the coupling means 31a for the die holder 16 and the coupling means 18 for the movable clamp means 12 and, in this state, the pressure application cylinder 3 is actuated to advance the ram 3a, thereby advancing the inner cylinder 6 against the force of the return spring 8. Consequently, the support leg portion 29 firmly fastened to the inner cylinder 6 and therefore the connection lever 31, die holder 26 and punching die 25 are advanced and, at the same time, the support leg portion 14 connected to the connection levers 31 by the coupling key 16 and therefore the movable clamp means 12 are advanced. Therefore, the outer cylinder 7 to which the support leg portion 14 is firmly fastened is also advanced. As a result, the reinforcing rod A clamped by the movable clamp means 12 is pressed against the reinforcing rod B clamped by the stationary clamp means 21. The portions of the reinforcing rods A and B kept in pressure contact with each other are headed by a ring-shaped burner (not shown), thereby effecting the pressure welding to form a bulge around the heated portions.

Figure 1D:
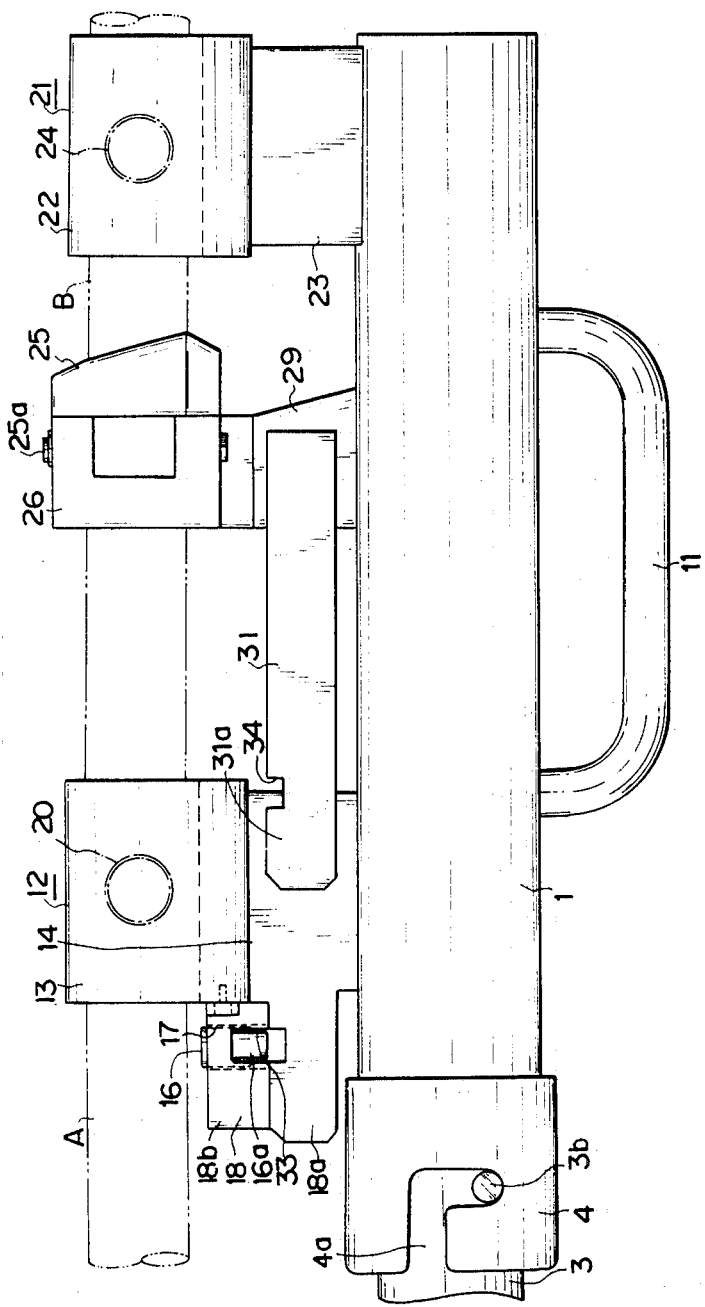
FIG. 1D is a side view showing the gas pressure welding machine, with the punching die disconnected from the movable clamp means.
Figure 4:
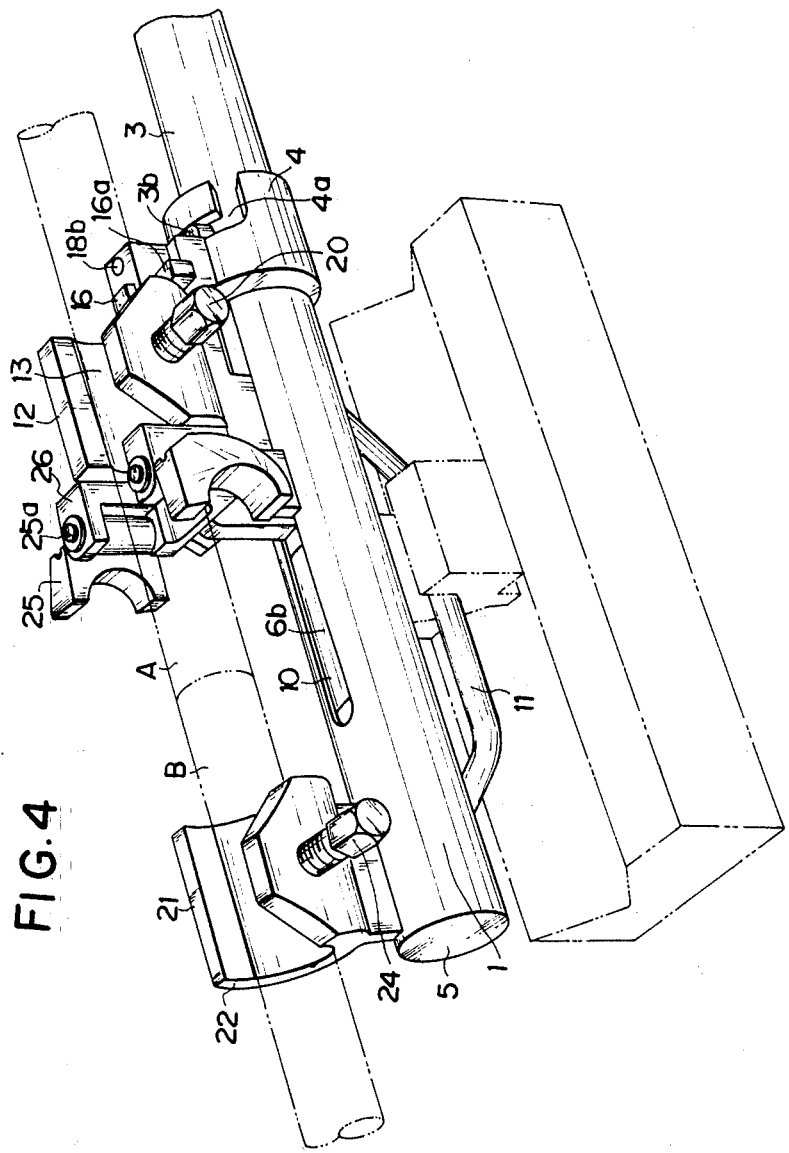
FIG. 4 is a perspective view showing the gas pressure welding machine in the state shown in FIG. 2.
Figure 5:
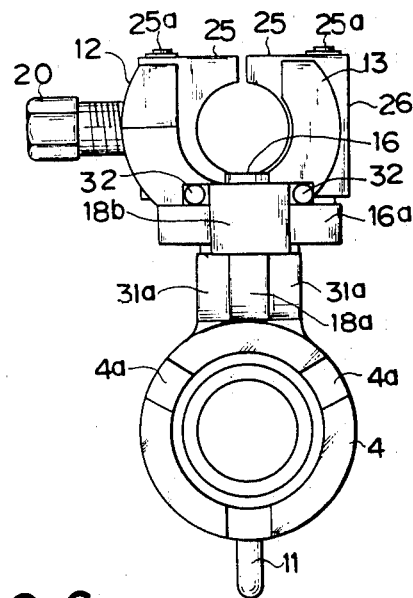
FIG. 5 is a rear view showing the gas pressure welding machine in the state shown in FIG. 3.
Figure 6:
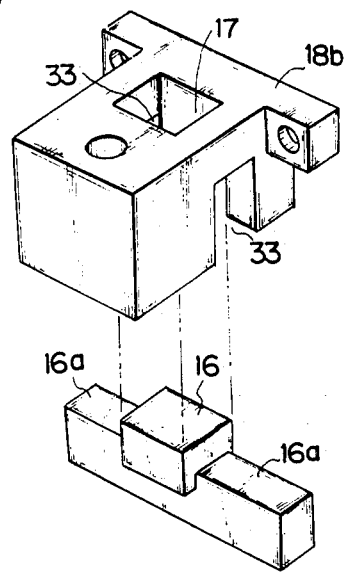
FIG. 6 is an enlarged perspective view showing a coupling key and a key retaining block used in the gas pressure welding machine.

Upon completion of the pressure welding, the application of pressure by the pressure application cylinder 3 is once stopped to release the exerted pressure load, with the result that the coupling key 16 is pushed upward by the pushing-up spring 30 (FIG. 1B) to release the connection between the movable clamp means 12 and the punching die 25. In this state, when the pressure application cylinder 3 is again actuated, only the punching die 25 and die holder 26 are advanced (FIG. 1D) to punching-shear the bulge at a stroke.

After the punching-shearing of the bulge by the puching die 25 has been completed, the edge members thereof are opened together to locate the punching die 5 at its punching-release position and loosen the clamping bolts 20 and 24 of the movable and stationary clamp means 12 and 21 to release the joined reinforcing rods. Then, the ram 3a of the pressure application cylinder 3 is retreated to allow the inner cylinder 6 to be returned to its original position by the force of the return spring 8 as slid on the inside of the guide cylinder 1. At this time, the outer cylinder 7 is also returned to its original position as slid on the inside of the guide cylinder 1.

As described above, gas pressure welding of reinforcing rods necessitates formation of a bulge and punching-shearing of the bulge, and it is desirable that the punching-shearing operation be effected under red heat of the bulge immediately after completion of the gas pressure welding. According to the present invention, the pressure welding of the reinforcing rods and the punching-shearing of the bulge can be carried out sequentially. When the movable clamp means is moved for the purpose of pressure welding, the punching die is followed to secure its position immediately before the bulge being formed so that it may immediately cut the formed bulge. The bulge under red heat can advantageously be sheared by punching of the punching die from that position.

In the present invention, since the edge members of the punching die are pivotally supported on the die holder so as to be opened together on hinges into the punching-release position and closed together on hinges into the punching position, it is unnecessary to attach the punching die to or detach the same from the pressure welding machine every one time of use or termination of use. That is to say, in the present invention, the operation of setting the punching die close to or apart from the peripheries of the reinforcing rods can be easily carried out merely by closing or opening the edge members together on hinges without requiring the aforementioned troublesome attachment or detachment of the punching die and, therefore, the construction as a whole becomes simple.

What is claimed is:

1. A gas pressure welding machine comprising a movable clamp means for clamping one of reinforcing rods to be joined together; a stationary clamp means for clamping the other reinforcing rod; a punching die for punching-shearing a bulge being formed around a joint portion of the reinforcing rods; a bottomed guide cylinder; a pressure application cylinder connected to one end of said guide cylinder and provided with a ram which is advanced or retreated within said guide cylinder; an outer cylinder slidably accommodated within said guide cylinder; an inner cylinder slidably accommodated within said outer cylinder, elastically energized toward said ram by means of a return spring, and adapted to come into collision contact with said ram so as to be movable in one direction in which said return spring is compressed when said ram is advanced and in the other direction in which said return spring is restored to its original position when said ram is retreated; a support leg portion firmly fixed to said guide cylinder for supporting thereon said stationary clamp means; a second support leg portion passed through a guide slot in said guide cylinder and firmly fixed to said outer cylinder for supporting thereon said movable clamp means; a third support leg portion passed through said guide slot in said guide cylinder and a second guide slot in said outer cylinder, and firmly fixed to said inner cylinder for supporting thereon said punching die; said movable clamp means being disposed as opposed to said stationary clamp means and moved close to or apart from said stationary clamp means with said guide slot in said guide cylinder and the inner circumference of said guide cylinder as its guides, and said punching die being interposed between said movable clamp means and said stationary clamp means and advanced or retreated it conjunction with said inner cylinder which is moved by said ram; and a key connection mechanism for detachably connecting said movable clamp means and said punching die; said movable clamp means being advanced in conjunction with said punching die by the advancement of said ram in a state wherein said movable clamp means and said punching die are connected by said key connection mechanism, thereby subjecting the reinforcing rods to gas pressure welding in a butted state to form a bulge around a joint portion of the reinforcing rods; only said die holder and said punching die thereon, upon detached from said movable clamp means, being advanced by the advancement of said ram to punchingshear the bulge.

2. A gas pressure welding machine according to claim 1, wherein said punching die is divided into a pair of edge members which are opened or closed together on hinges, and is kept in its punching-release position when said edge members are opened relative to each other and in its punching position when said edge members are closed relative to each other.

3. A gas pressure welding machine according to claim 2, wherein said pair of edge members are each elastically supported at both the punching position and the punchingrelease position of said punching die to secure the two positions of said punching die.

4. A gas pressure welding machine according to claim 1, wherein said key connection mechanism serves to disconnect said punching die from said movable clamp means by means of the force of a spring in its normal condition, to retain the connection therebetween against the spring force when said ram is advanced to advance said punching die, and to release the connection therebetween when said ram is retreated and the spring is restored.

* * * * *